Feb. 13, 1951   H. G. NIXON   2,541,274
TRAILER FLOOR CONSTRUCTION
Filed June 24, 1948
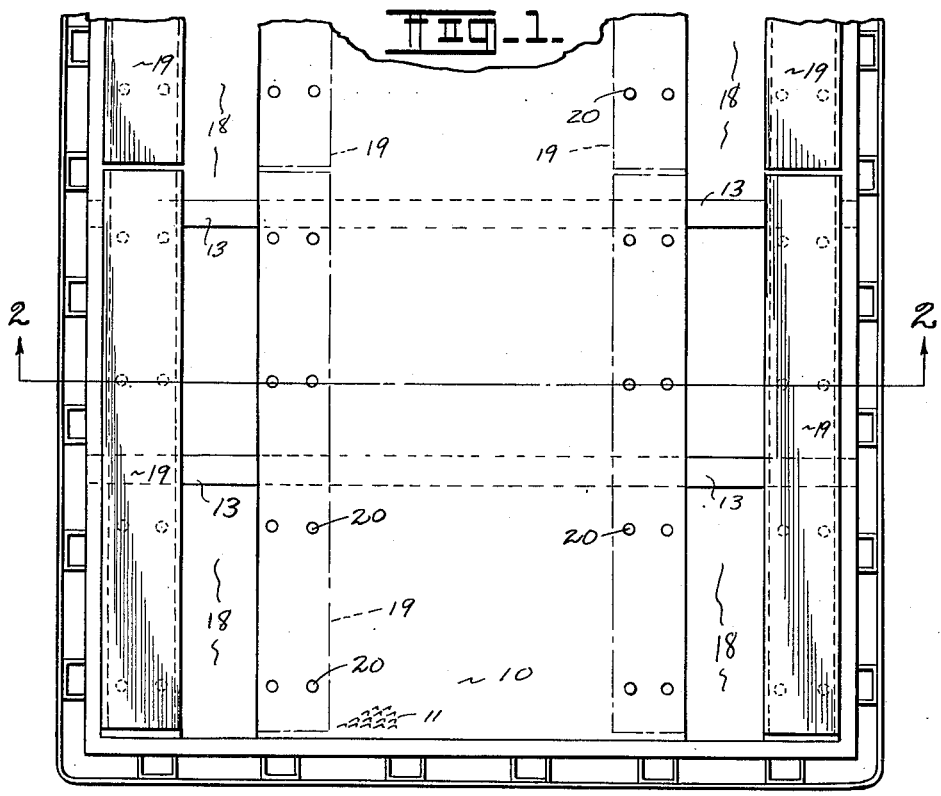
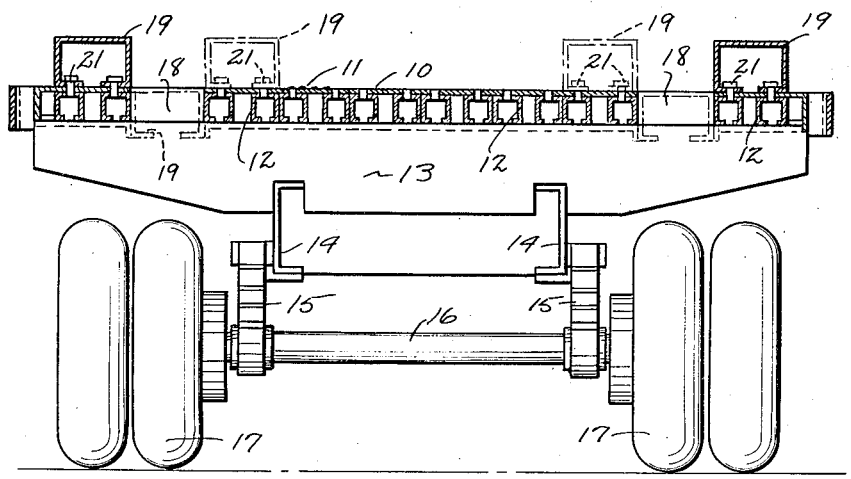
INVENTOR.
Harold G. Nixon
BY W. B. Harpman
ATTORNEY.

Patented Feb. 13, 1951

2,541,274

UNITED STATES PATENT OFFICE 2,541,274

TRAILER FLOOR CONSTRUCTION

Harold G. Nixon, Youngstown, Ohio

Application June 24, 1948, Serial No. 34,891

1 Claim. (Cl. 296—28)

This application is a division of my co-pending patent application on Trailer, Serial No. 745,079, filed April 30, 1947, now Patent No. 2,494,404.

This invention relates to a trailer floor construction and more particularly to a trailer floor construction adapted for hauling hot steel products.

The principal object of the invention is the provision of a trailer or semi-trailer floor construction adapted for use in hauling hot steel products and the like.

A further object of the invention is the provision of a trailer or semi-trailer floor construction having a deck incorporating blocking means for loads positioned thereon.

A still further object of the invention is the provision of a trailer or semi-trailer floor construction providing ventilating means for cooling heated metal positioned thereon.

A still further object of the invention is the provision of a trailer or semi-trailer floor construction which may be economically and easily constructed of available materials and which may be used for hauling steel sheets, plates and rolls of strip and the like immediately after their formation and/or processing and while in heated condition.

The trailer floor construction shown and described herein is adapted for trailer or semi-trailer use such as commonly employed in hauling heavy loads and wherein the trailers or semi-trailers are hauled by conventional highway tractors. It is well known that many and various types of trailer constructions have been proposed and include trailers and semi-trailer constructions for use with tractors to form tractor and semi-trailer combinations for handling heavy freight and the like. It is also known that to date these constructions have employed wooden deck structures primarily to hold the weight of the trailer or semi-trailer to the minimum possible. Trailers and semi-trailers are efficiently used in handling various freight products such as steel and the like with the exception that hot steel, as it is received directly from a mill, cannot be hauled thereon. A great deal of the hot steel products so produced are placed directly in steel railway cars for transportation. One of the objects of this invention is to provide a trailer or semi-trailer floor construction which may be used in handling hot steel products directly from the mill and which will haul the products efficiently and at the same time impart a cooling action thereto all without damage to the trailer or semi-trailer employed.

The several objects of the invention are believed to be met in the provision of a trailer or semi-trailer of conventional frame design and having a novel, lightweight metal floor or deck construction incorporating blocking members as a part thereof which may be removed and employed in various positions on the deck for blocking loads thereon. The construction also provides for useful deflection of air currents over the load to expedite the cooling of hot materials hauled on the trailer or semi-trailer so formed.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of a portion of a trailer or semi-trailer with parts broken away and illustrating the positioning of the removable interchangeable blocking means and ventilating means.

Figure 2 is a horizontal cross section taken on line 2—2 of Figure 1.

By referring to the drawing it will be seen that a trailer or semi-trailer construction has been disclosed which includes an upper deck 10 preferably formed of lightweight metal and suitably embossed or otherwise treated on its uppermost surface to provide a non-skid surface such as indicated by the numeral 11. The deck 10 is supported by a plurality of longitudinally extending channels 12 each of which comprise approximately inverted U-shaped members and run the length of the trailer or semi-trailer deck. The longitudinal channels 12 are in turn supported on a plurality of transversely positioned channels 13 which are spaced with respect to one another and form the structural portions of the trailer or semi-trailer construction which overhangs the wheel areas and forms the effective width of the trailer or semi-trailer.

The plurality of transversely positioned channels which are relatively larger in size and relatively fewer in number than the longitudinal channels 12 heretofore referred to are in turn carried on a pair of spaced, relatively heavy, longitudinally extending frame members 14. The frame members 14 comprise the main frame of the trailer or semi-trailer and directly support the hitch means (not shown) at the foremost end and the wheel axle and spring assemblies at the rearmost end of the trailer. As shown in Figure 2 of the drawing the spring assemblies are indicated by the numerals 15—15, the axle by the numeral 16 and the dual wheels by the numerals 17—17. The transverse channels 13 are welded, riveted or otherwise secured to the longitudinal main frame 14 and the longitudinal channels 12 are welded, riveted or otherwise secured to the transverse channels 13.

By referring to Figure 2 in particular it will be observed that the arrangement of the longitudinally extending channels 12 and the deck plates 10 is such that a pair of spaced longitudinally extending openings 18—18 are formed, which longitudinally extending openings 18—18 run the full length of the trailer or semi-trailer construction. In order that these openings 18—18 may be filled to form a continuous unbroken flat deck on the trailer or semi-trailer a plurality of channel shaped blocking members 19 are disposed therein to equal the length of the plurality of channel-like blocking members in end to end relation and conforming with the length of the openings 18. It will be observed that the channel members 19 are notched at intervals thereon to permit them to register over the transverse channels 13 and thereby permit them to drop into position where the uppermost surfaces are flush with the uppermost surface of the deck 10.

As shown in Figures 1 and 2 of the drawings the positioning of the blocking members 19 in the longitudinally extending, spaced openings 18 forms a flat unbroken trailer deck. The trailer deck is also provided with a plurality of spaced openings 20 and the inturned flanges on the bottoms of each of the blocking members 19 are provided with studs 21 for registry with the openings 20 as, for example, at such time as the blocking members 19 are lifted out of their positions in the openings 18 and placed either transversely or longitudinally of the trailer bed, as shown in Figure 2 of the drawings, to form appropriately positioned blocking members for loads carried on the trailer or semi-trailer construction.

It will be observed that at such times as the blocking members 19 are removed from the longitudinally extending openings 18, the openings 18 form means by which cooling air will be directed upwardly through the same and against a load thereon, the transverse channels 13 forming baffles in the normal air stream for directing the air upwardly through the openings 18 and against a load thereon, for example, hot steel to be cooled. It will be obvious to those skilled in the art that the various channel members incorporated in the construction of the trailer and blocking members 19 may be provided with cutaway sections to lighten the same without affecting their strength or load carrying ability and the blocking members 19 in particular are advantageously shaped in this manner to make them of relatively light weight and capable of ease in handling.

It will thus be seen that the trailer or semi-trailer construction disclosed herein is efficient and relatively simple and that when formed of suitable metals is capable of supporting unusually heavy loads and at the same time provides for the necessary blocking by making available portions of the trailer structure as blocking members. In addition, it will be observed that the removal of the blocking members from their normal positions in the trailer deck creates air passageways which combined with the air deflection means inherent in the transverse channels 13 of the device creates a highly desirable air cooling action for certain materials such as sheets or coils of steel which may be loaded on the trailer directly from the mill and will obviously be of relatively high temperature. The provision of the trailer or semi-trailer floor construction makes possible the use of truck and trailer or tractor and semi-trailer combinations in the hauling of steel which materials have heretofore been incapable of being transported by such means. The invention therefore contributes substantially to the welfare of the trucking industry as well as to the steel producing and consuming industries as more efficient, less expensive transportation is available for various hot finished steel products.

Having thus described my invention, what I claim is:

In a vehicle deck construction having longitudinally extending main framing members and several transverse framing members positioned thereon and secured thereto; a plurality of deck flooring members secured to said transverse framing members, said deck flooring members lying longitudinally of the said deck and arranged to form a pair of spaced longitudinally extending openings in the said vehicle deck, a plurality of stud receiving openings in said deck flooring members and inverted channel members removably positioned in the said longitudinal openings and carried on the said transversely positioned framing members, studs on the said channel members for registry in the said stud receiving openings when the said inverted channel members are removed from the said longitudinal openings in the deck and placed thereon to form blocking members.

HAROLD G. NIXON.

REFERENCES CITED

The following references are of record in the file of this patent:

UNITED STATES PATENTS

| Number | Name | Date |
|---|---|---|
| 697,650 | Nagel | Apr. 15, 1902 |
| 713,748 | Carnahan | Nov. 18, 1902 |
| 889,320 | Meglemer et al. | June 2, 1908 |
| 1,908,457 | Swift et al. | May 9, 1933 |
| 2,107,853 | Coffey | Feb. 8, 1938 |
| 2,256,037 | Reid | Sept. 16, 1941 |
| 2,450,204 | Pridy | Sept. 28, 1948 |

FOREIGN PATENTS

| Number | Country | Date |
|---|---|---|
| 516,661 | Great Britain | Jan. 8, 1940 |